United States Patent [19]

Williams

[11] Patent Number: 5,673,492
[45] Date of Patent: Oct. 7, 1997

[54] PERSPECTIVE DRAWING ALIGNMENT APPARATUS

[75] Inventor: Jack D. Williams, Moundsville, W. Va.

[73] Assignee: Adena Ideas, Moundsville, W. Va.

[21] Appl. No.: 434,028

[22] Filed: May 3, 1995

[51] Int. Cl.[6] .............................. B43L 13/18; G01B 11/27
[52] U.S. Cl. .................. 33/432; 33/286; 33/DIG. 21
[58] Field of Search ........................... 33/432, 228, 274, 33/286, 293, 483, 484, 485, DIG. 21

[56] References Cited

U.S. PATENT DOCUMENTS

| | | | |
|---|---|---|---|
| D. 347,018 | 5/1994 | Jehn . | |
| 356,503 | 1/1887 | Rittenhouse | 33/274 |
| 2,531,636 | 11/1950 | McCullough | 33/432 |
| 2,641,840 | 6/1953 | Gariss . | |
| 2,877,555 | 3/1959 | Visockis, Jr. | 33/DIG. 21 |
| 3,175,295 | 3/1965 | Selley . | |
| 3,503,129 | 3/1970 | Saxton | 33/432 |
| 3,521,364 | 7/1970 | Metcalfe | 33/293 |
| 3,619,069 | 11/1971 | Alexander | 33/286 |
| 4,123,143 | 10/1978 | Yachin et al. . | |
| 4,752,352 | 6/1988 | Feygin . | |
| 4,785,546 | 11/1988 | Tomasini . | |
| 4,878,296 | 11/1989 | Londino, Jr. . | |
| 4,907,881 | 3/1990 | Jones . | |
| 4,926,438 | 5/1990 | Maes et al. . | |
| 4,926,561 | 5/1990 | Miller | 33/293 |
| 4,993,160 | 2/1991 | Fraley . | |
| 5,012,585 | 5/1991 | DiMaggio . | |
| 5,189,799 | 3/1993 | Fairer et al. . | |

FOREIGN PATENT DOCUMENTS

| | | | |
|---|---|---|---|
| 368935 | 6/1963 | Switzerland | 33/274 |
| 2225752 | 6/1990 | United Kingdom | 33/432 |

*Primary Examiner*—Christopher W. Fulton
*Attorney, Agent, or Firm*—Titus & McConomy

[57] ABSTRACT

The invention consists of a focused light beam source mounted on a straight-edge, which is aligned to an off-drawing vanishing point target reference, to sketch object lines in a manner which creates depth perspective and thus maintains the three-dimensional visual character of the object to be drawn. The desired line of the object is drawn after locating and marking the reference vanishing point which will maintain that object line in visual perspective with related object lines. The straight-edge is aligned by targeting a focused light beam at the vanishing point, and the object line is drawn along the straight-edge while the light beam is striking the target marking the vanishing point. The preferred embodiment of the invention is configured with one light source, and uses reflecting mirrors which direct the light beam along the straight edge. The invention can alternately be configured with more than one light beam source, either with or without reflectors, to accomplish the same alignment function.

14 Claims, 9 Drawing Sheets

PERSPECTIVE DRAWING ALIGNMENT APPARATUS

BACKGROUND OF THE INVENTION

The invention is used by a draftsman or an artist to sight and draw perspective views of objects. Perspective drawing entails projecting an object onto paper while maintaining the proper spatial relationships between object lines to create the feeling of depth. In so doing, a two-dimensional image is constructed which accurately portrays the three-dimensional visual character of the object. This is accomplished by projecting a line of the object onto paper after it is aligned to a target reference point in space, known as the vanishing point. Alignment to this reference vanishing point ensures that the proper spatial relationship will be maintained between that object line and the others which must be oriented relative to it in order to create an accurate three-dimensional image for the object on paper.

Prior art disclosures of perspective drawing devices suffer from three major problems: first, they do not generally offer the level of precision necessary to accurately reproduce perspective views of objects which are complex in shape, since they employ sighting methods which depend completely on a tried eye for accuracy, without the aid of any focused light source to illuminate the vanishing point reference; second, they generally lack portability, since quick and easy relocation of previously fixed vanishing points is not possible using the sighting methods employed, which usually requires that the drawing be completed in one sitting; finally, they are generally cumbersome and unwieldly in use, often involving large pieces of mechanically complex equipment, and often requiring re-orientation of the drawing or vanishing point target before sighting the next object line to be drawn.

This invention attempts to solve these problems by using a focused light beam for aligning the object lines to be dram, where the beam is targeted to illuminate the vanishing point reference during the sighting process which takes place prior to the drawing of each line. This focused light beam sighting process allows each line to be quickly and accurately drawn, which results in a precise three dimensional reproduction of the object without having to re-orient the drawing or the vanishing point target prior to the drawing of each new line. Furthermore, use of the focused light beam does not involve the elaborate sighting process required by prior art disclosures to relocate previously fixed vanishing points. This easy vanishing point relocation method results in portability, since it allows a partially completed drawing to be easily moved. Finally, this invention utilizes a compact straight-edge, which is uncomplicated in construction and easy to use.

SUMMARY OF THE INVENTION

The invention consists of a focused light beam source mounted on a straight-edge, which is aligned to an off-drawing vanishing point reference, to sketch object lines in a manner which creates depth perspective and thus maintains the three-dimensional visual character of the object to be drawn. The desired line of the object is drawn after locating and marking the reference vanishing point which will maintain that object line in visual perspective with related object lines. The straight-edge is aligned by targeting a focused light beam at the vanishing point, and the object line is drawn along the straight-edge while the light beam is striking the target marking the vanishing point. The preferred embodiment of the invention is configured with one light source, and uses reflecting mirrors which direct the light beam along the straight edge. The invention can alternately be configured with more than one light beam source, either with or without reflectors, to accomplish the same alignment function.

It is an object of this invention to provide a perspective drawing apparatus which uses a focused light beam source that quickly and precisely align object lines to their reference vanishing points, without having to re-orient the drawing or the vanishing point target.

It is a further object of this invention to provide a method for quickly and accurately relocating a reference vanishing point if it is moved, to allow a partially completed drawing to be easily finished in another location.

It is a further object of this invention to utilize a compact straight-edge as the alignment instrument, which is uncomplicated in construction and easy to use.

These and other objects and advantages of the invention will become better understood with reference to the following detailed description in conjunction with the appended claims and accompanying drawings.

BRIEF DESCRIPTION OF THE DRAWINGS

FIG. (1) is a three-dimensional isometric projection of the preferred embodiment of the straight-edge. FIG. (1A) is an overhead view of the embodiment shown in FIG. (1).

FIG. (2) is a three-dimensional isometric projection of the preferred embodiment, configured to use the opposite straight-edge drawing surface from the one shown in FIG. (1). FIG. (2A) is an overhead view of the embodiment shown in FIG. (2).

FIG. (3) is a three-dimensional isometric projection of a prospective straight-edge configuration which uses two light beam sources without reflectors. FIG. (3A) is an overhead view of the configuration shown in FIG. (3).

FIG. (4) is a three-dimensional isometric projection of a prospective straight-edge configuration which uses two light beam sources with reflectors. FIG. (4A) is an overhead view of the configuration shown in FIG. (4).

FIG. (5) is a three-dimensional isometric projection of a prospective straight-edge configuration which uses a single sliding light beam source. FIG. (5A) is an overhead view of the configuration shown in FIG. (5).

FIG. (6) is a three-dimensional isometric projection of a prospective straight-edge configuration which uses a single fixed light beam source and a swinging reflector. FIG. (6A) is an overhead view of the configuration shown in FIG. (6).

FIG. (7) is a cross-sectional view of the preferred embodiment of the vanishing point marker.

FIG. (8) is an electrical schematic drawing of the single light beam source used in the preferred embodiment of the invention. FIG. (8A) is an electrical schematic of a prospective two light beam source configuration.

FIGS. (9) and (9A) are overhead views of the method of using the invention to sight and draw perspective views of an object, and to relocate previously fixed vanishing points.

DETAILED DESCRIPTION OF THE INVENTION

Figure 1:
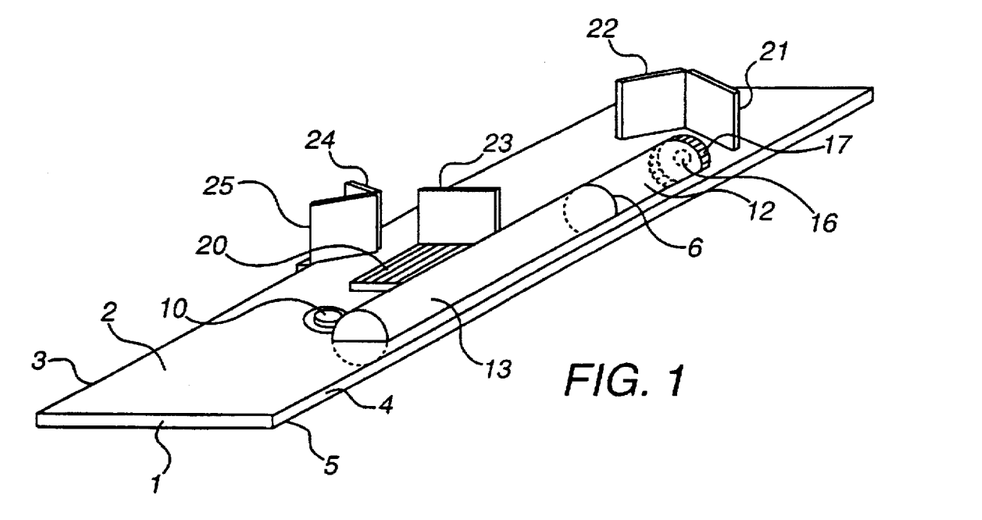
Figure 1A:
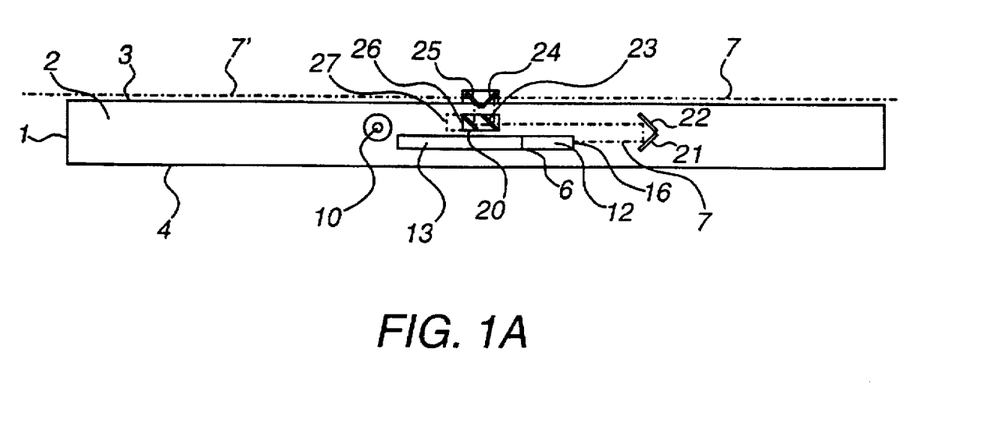
Figure 2:
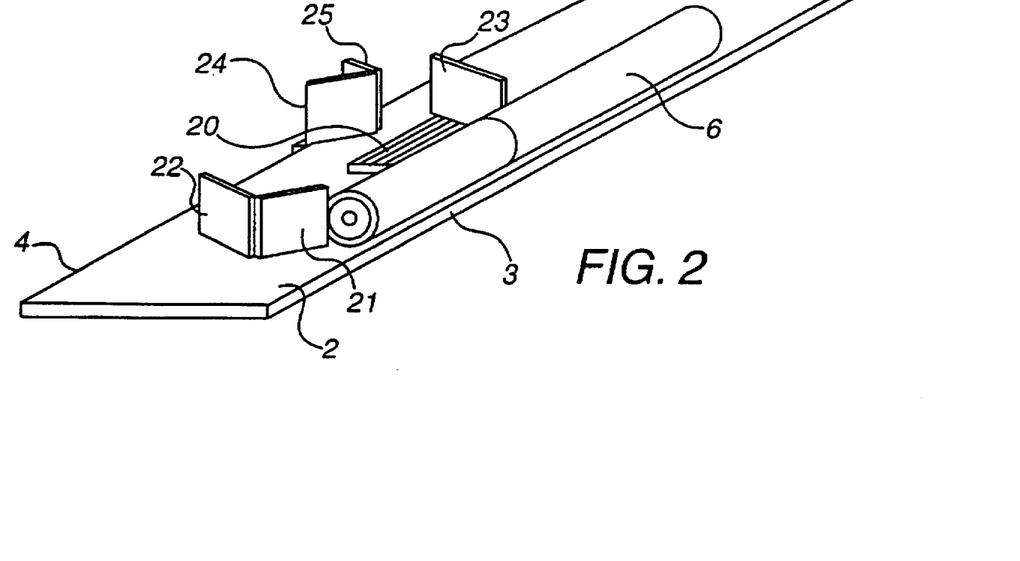
Figure 2A:
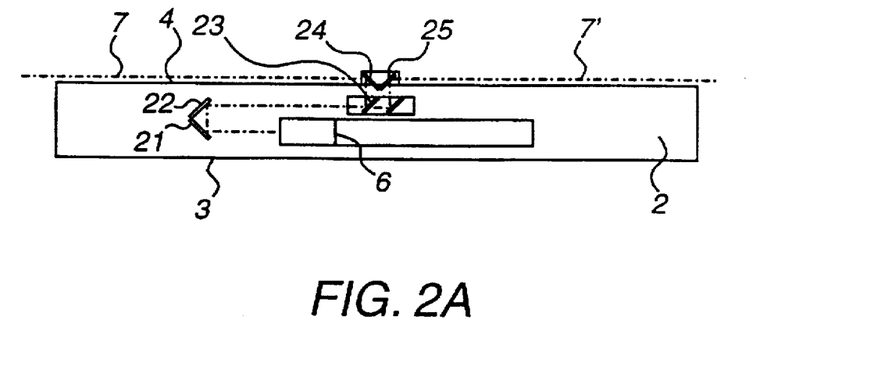
Figure 3:
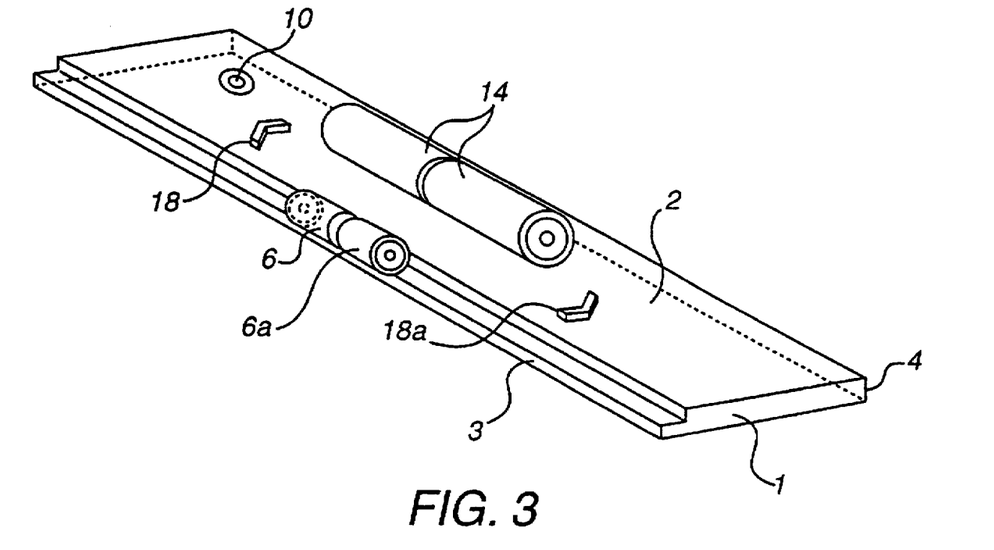
Figure 3A:
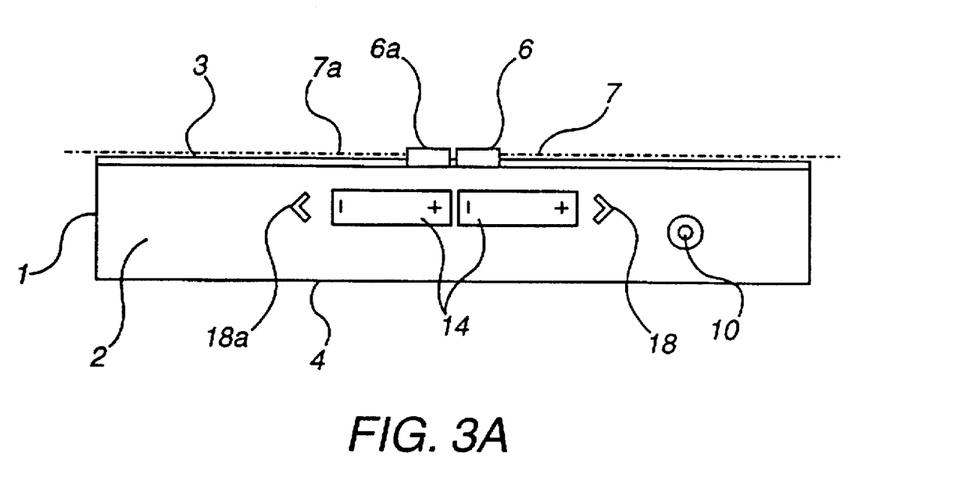

Referring to the preferred embodiment of the invention shown in FIGS. (1) and (1A), the invention is comprised of a straight-edge 1, which has a flat top surface 2 for mounting the other elements of the alignment apparatus. In the preferred embodiment of the invention shown in FIGS. (1) and (1A), the straight-edge 1 is of rectangular shape with two straight pencil edges 3 and 4 forming the long sides of a plastic base 5. However, the straight-edge can be cut to any desired shape, so long as it has a flat top surface for mounting the other elements of the invention and at least one straight edge on its side for guiding a drawing implement. The straight-edge base can be made of any desired material with the strength to support the mounting of the other elements of the invention. Prospective examples are wood, metal, hard rubber, or glass.

Mounted to the straight-edge top surface 2 as shown in FIGS. (1) and (1A) is a light beam source 6, which is a cylindrical hollow metal housing of pen-size dimensions that contains light beam generating circuitry. In the preferred embodiment of the invention shown in FIGS. (1) and (1A), the light beam source 6 is divided into two connected parts, a light-emitting side 12 in which the light beam generator is housed, and a non light-emitting side 13 in which a battery power pack is housed. The generated light beam 7 escapes the light-emitting side 12 through an aperture end 16, after being focused into a pinpoint through a focusing device 17. In the preferred embodiment of the invention, the focusing device 17 is comprised of a single optical lens used to focus the light beam. However, a combination of lenses may be needed to achieve a pinpoint focus for the light beam, depending on the type of light beam generation means used.

Figure 8:
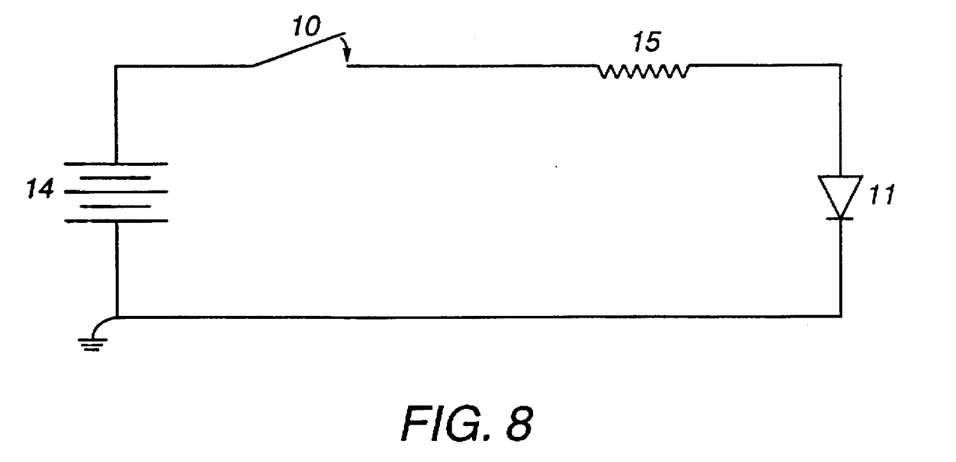
Figure 8A:
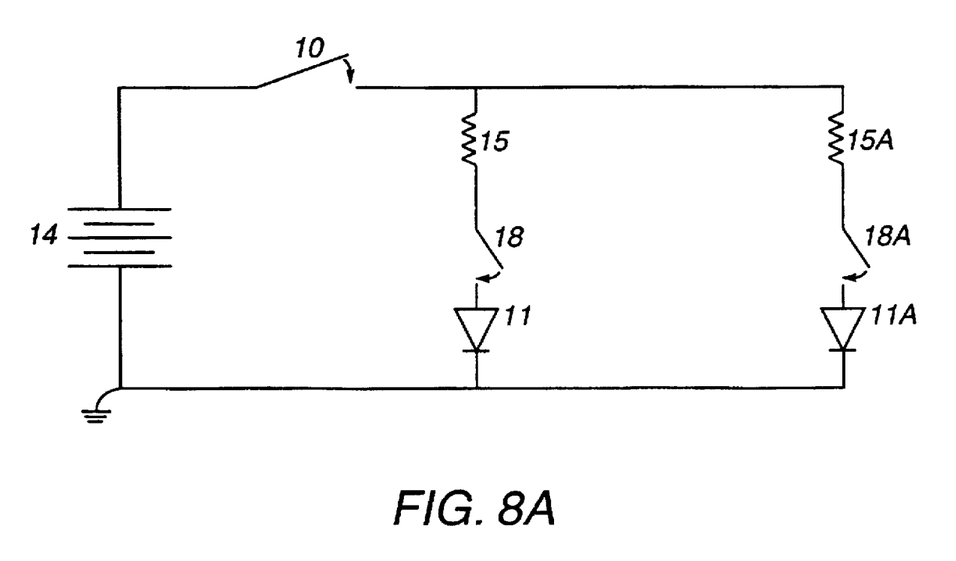

Electrical schematics of the light beam source are shown in FIGS. (8) and (8A). In the preferred embodiment of the invention, the light beam generator 11 is comprised of a red dot laser diode, but any means of generating a visible beam of light will suffice, so long as the light is capable of being focused into a pinpoint by the focusing device housed in the aperture end of the light beam source. Prospective examples are a high-intensity flashlight bulb or a normal light-emitting diode, so long as they are sized to fit the light beam source. In the preferred embodiment of the invention, shown in FIG. (8), only one light beam source is used, as light reflecting mirrors are used to direct the light beam in the desired direction along a straight edge pencil edge. However, in alternate prospective embodiments of the invention to be described below, two light beam sources as shown in FIG. (8A) could be used, either with or without light reflectors, to direct a light beam in either direction along the desired straight-edge pencil edge. The electrical circuit for energizing the light beam generator is completed by the light beam source housing, which has an electrically conductive surface 15 connecting the light beam generator 11 to the battery power pack 14 through a switch 10. The electrically conductive surface 15 of the light beam source housing can be made of any ordinary metal, such as aluminum, steel, copper, or brass. The grounded light beam generator 11 passes current from the electrically conductive surface 15 of its light beam source housing. The battery power pack 14 has one grounded terminal, with the other terminal connected to the electrically conductive surface 15 of the light beam source housing through a switch 10. In the preferred embodiment of the invention, a single switch 10 is used to control power to the light beam generator 11. In alternate prospective embodiments of the invention which use two light beam sources, a second switch 18 and a third switch 18a are added to energize each light beam generator 11 and 11a separately through the electrically conductive surfaces 15 and 15a of their respective light beam source housings, as shown in FIG. (8A). In the preferred embodiment of the invention, a threaded hollow brass shell was used to house both the light beam generator and the battery power pack. In alternate prospective embodiments of the invention which use two light beam sources, the battery power pack is not contained in a single housing with the light beam generator. The switch 10 utilized in the preferred embodiment is comprised of mechanical metal contacts, but an electrical switch may be employed as well.

Figure 7:
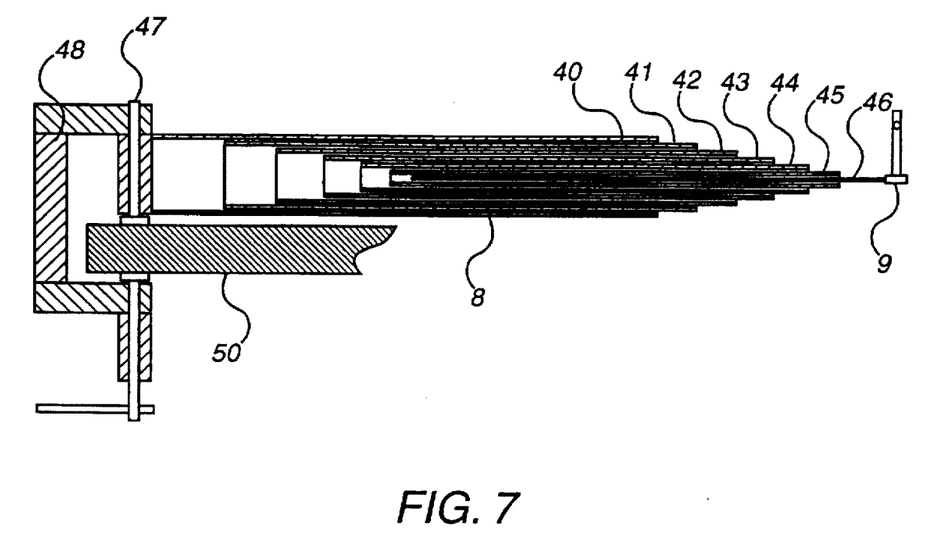

After a light beam has been directed along the desired straight-edge pencil edge, it is aimed at a vanishing point marker. The preferred embodiment of the vanishing point marker 8, shown in FIG. (7), is a collapsing telescopic rod having a base subsection 40 encompassing outer subsections 41–46 of successively smaller diameter. The base subsection 40 is pivotably attached by means of a pin 47 to a "C" clamp 48 which is anchorable to a flat sketching surface 50, such that the vanishing point marker 8 swivels in the plane of the drawing. The outermost subsection 46 contains a target 9 at which the light beam is aimed. Alternate embodiments of the vanishing point marker are possible, such as the prospective configuration in which a stiff retractable tape measure-type device is used, which has the target on its tip, and a base attached to a clamp anchoring the vanishing point marker. The essential feature of the vanishing point marker is that its target remain stationary while the perspective view alignment process is taking place, and that it be adjustable to alternate positions from the same anchor spot to allow for fine timing of the vanishing point location.

In the preferred embodiment shown in FIGS. (1) and (1A), four light reflectors 21, 22, 24, and 25, mounted in prefabricated slots in the straight edge 1, with reflective surfaces perpendicular to the straight-edge top surface 2, are used to redirect the light beam 7 emitted from the single light beam surface 6 along a straight-edge pencil edge 3 or 4, from a path which is initially parallel to that pencil edge. The light beam source 6 is fixed to the center of the straight-edge top surface 2, with its long axis parallel to both pencil edges 3 and 4. The surface of the first light reflector 21 is oriented such that the light beam 7 will be reflected from a 45 degree angle of incidence to a path of travel which is perpendicular to its initial path, and thus perpendicular to the pencil edges 3 and 4. After being reflected from the first light reflector 21, the light beam 7 is directed to the second light reflector 22. The surface of the second light reflector 22 is oriented perpendicular to the surface of the first light reflector 21, such that the light beam 7 is reflected from a 45 degree angle of incidence off the second light reflector 22 to a path which is parallel to and in the opposite direction from its initial path of travel. After being reflected from the second light reflector 22, the light beam 7 is directed to a movable third light reflector 23, which is mounted on a sliding base 20. The sliding base 20 moves between two stationary positions, a first position 26 which will send the light beam 7 to a fourth light reflector 24, and a second position 27 which will send the light beam 7' to a fifth light reflector 25. In either the first position 26 or the second position 27, the light beam 7 or 7' is reflected from a 45 degree angle of incidence off the third light reflector 23 to a path which is toward and perpendicular to a pencil edge 3 or 4. Depending on how it is attached to the straight-edge top surface 2, the third light reflector 23 can direct the light beam 7 or 7' to either pencil edge 3 or 4. In FIGS. (1) and (1A), the light beam 7 or 7' is reflected to pencil edge 3, where the fourth light reflector 24 and the fifth light reflector 25 have reflective surfaces attached perpendicular to each other over the pencil edge 3. The light beam 7 or 7' will be reflected from a 45 degree angle of incidence from either the fourth light reflector 24 or the fifth light reflector 25, to a path which is along the pencil edge 3. However, the fourth light reflector 24 will reflect the light beam 7 in one direction along the pencil edge 3 when the third light reflector 23 is in its first position 26, and the fifth light reflector 25 will reflect the light beam 7' in the opposite direction along the pencil edge 3 when the third light reflector 23 is in its second position 27. In this way, the direction of the light beam can be controlled to aim at a vanishing point marker located in either direction without having to alter the prefabricated light reflector configuration. In the preferred embodiment of the invention, the light reflectors are comprised of mirrors made of silver-oxide coated glass. However, any surface reflective enough to maintain the pinpoint focus of the light beam may be used. Prospective examples are polished aluminum or chrome.

In FIGS. (2) and (2A.), the configuration of the light beam source 6 and the light reflectors 21-25 has been manually rearranged using different prefabricated slots in the straight-edge top surface 2, to allow the light beam 7 or 7' to be directed along the opposite pencil edge 4. The orientation and operation of the light reflectors with respect to each other and the resulting path of travel of the light beam is the same as described for FIGS. (1) and (1A), except that the light beam 7 or 7' now travels along the opposite pencil edge 4.

Alternate prospective embodiments of the invention using two light beam sources are shown in FIGS. (3)–(3A) and (4)–(4A). In FIGS. (3) and (3A), the straight-edge 1 has two light beam sources 6 and 6a, each attached to the straight-edge top surface 2 over a single pencil edge 3, such that the light beam 7 emitted from the first light beam source 6 will travel along and away from the midlength point of the pencil edge 3, in a direction 180 degrees opposed to the light beam 7a emitted from the second light beam source 6a. In this embodiment of the invention, light reflectors are not needed to direct the light beam along a straight-edge pencil edge. If desired, the invention can be manually reconfigured to utilize the opposite pencil edge by mounting light beam sources 6 and 6a over pencil edge 4 in the manner just described. The prospective embodiment shown in FIGS. (3) and (3A) has the dual switch feature 18 and 18a for energizing each light beam source 6 or 6a separately, through a switch 10 connected to the separately housed battery power pack 14.

Figure 4:
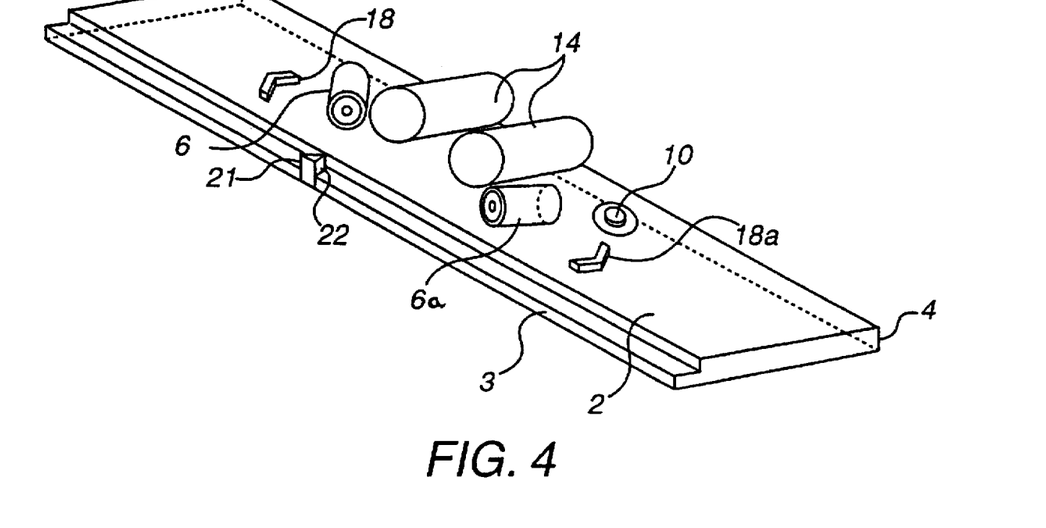
Figure 4A:
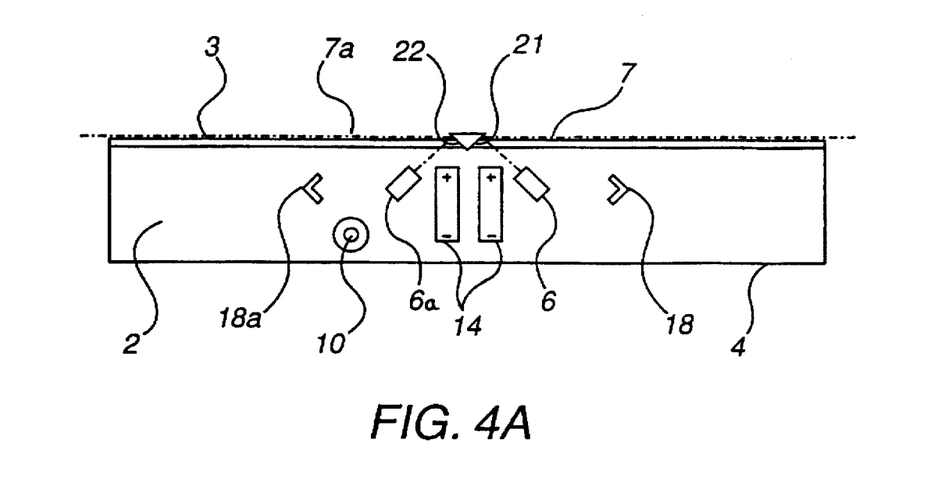
Figure 5:
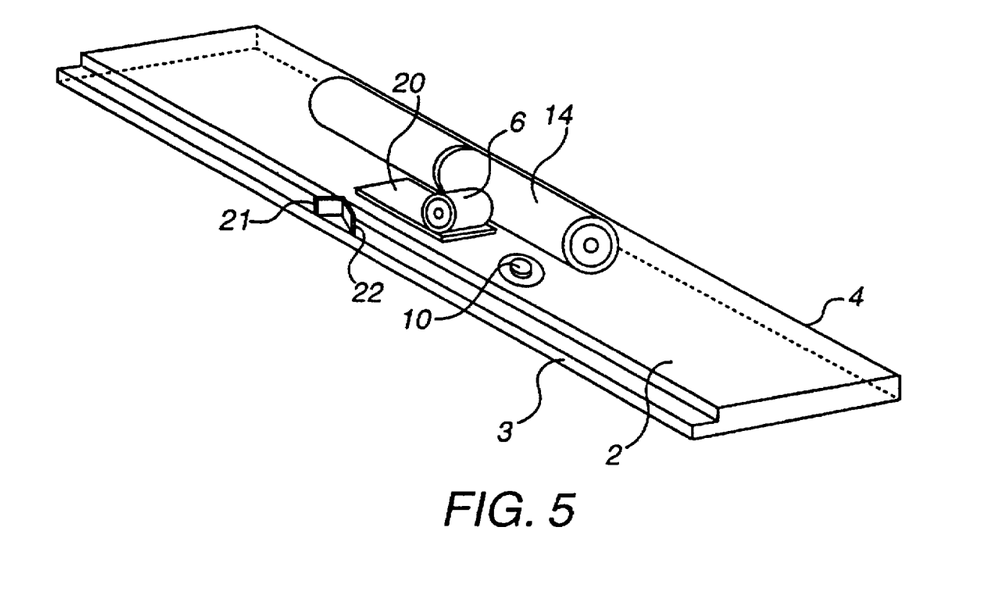
Figure 5A:
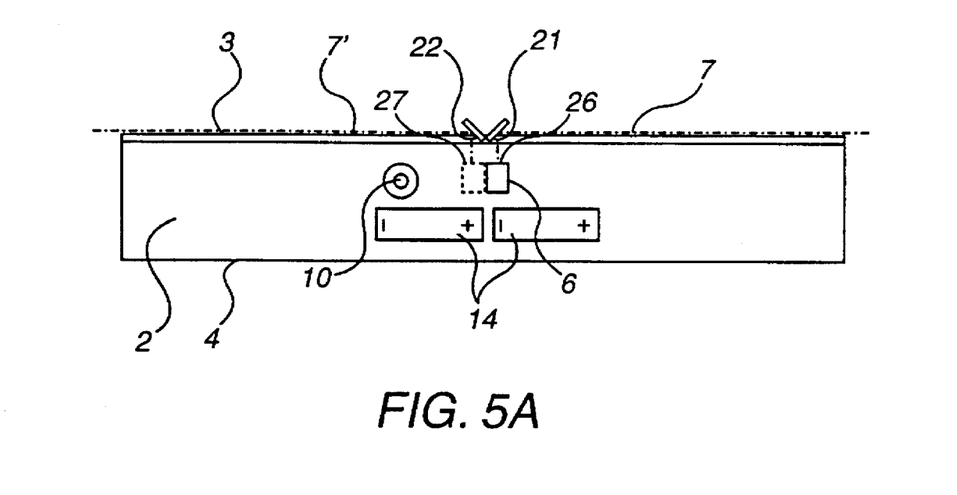
Figure 6:
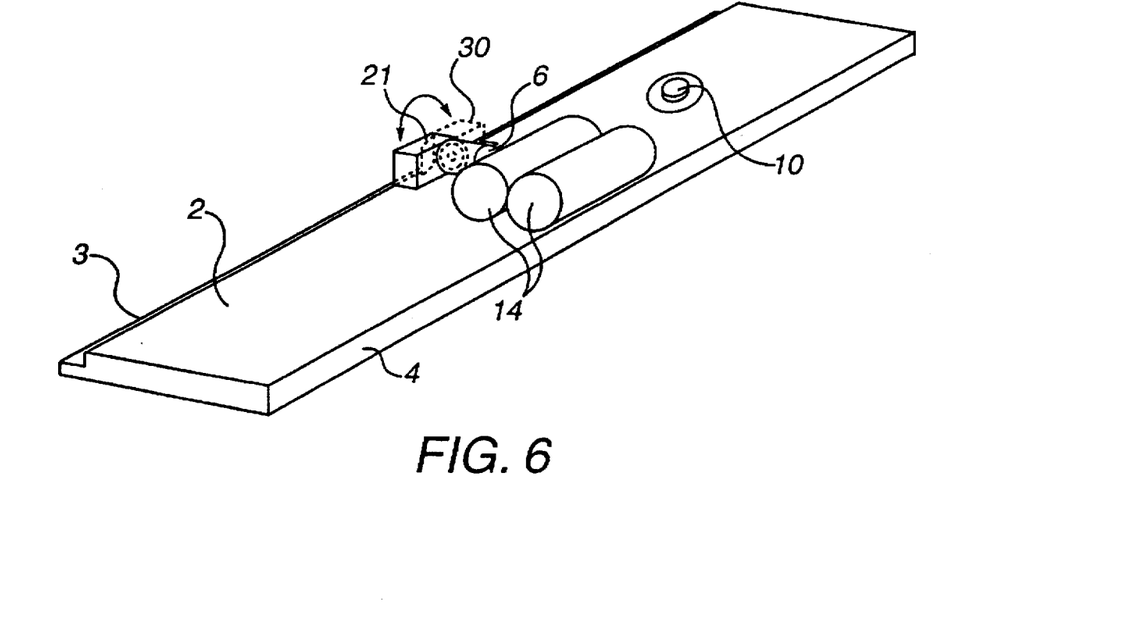
Figure 6A:
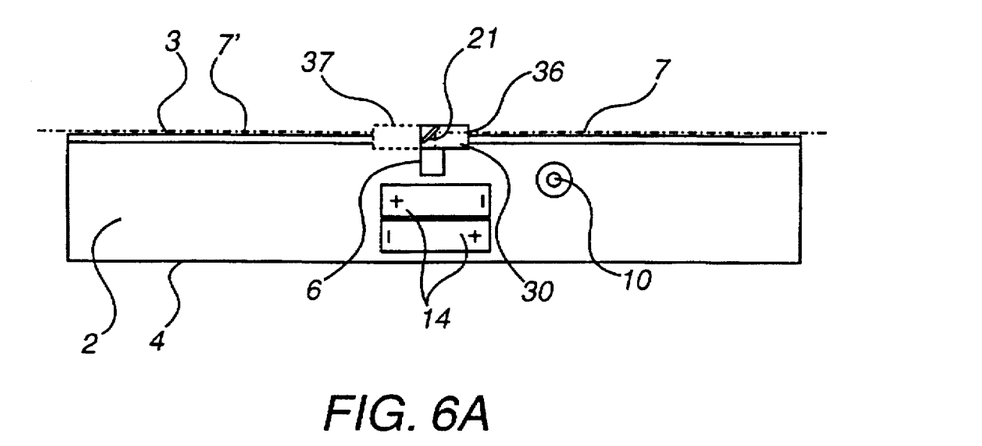

In FIGS. (4) and (4A), two light beam sources 6 and 6a are fixed to the straight-edge top surface 2 near opposite ends of pencil edge 3, such that the initial path of the light beam 7 emitted from the first light beam source 6 intersects the path of the light beam 7a emitted from the second light beam source 6a over the pencil edge 3. Two light reflectors 21 and 22 are used to redirect the light beams along the pencil edge 3. First light reflector 21 will reflect the light beam 7 emitted from the first light beam source 6 along the pencil edge 3 in one direction, while in the same manner the second light reflector 22 will reflect the light beam 7a emitted from the second light beam source 6a along the pencil edge 3 in the opposite direction, 180 degrees opposed from the final path of the light beam 7 reflected from the first light reflector 21. If desired, the invention can be manually reconfigured to utilize the opposite pencil edge by mounting light beam sources 6 and 6a and light reflectors 21 and 22 over pencil edge 4 in the manner just described. The prospective embodiment shown in FIGS. (4) and (4A) has the dual switch feature 18 and 18a for energizing each light beam source 6 or 6a separately, through a switch 10 connected to the separately housed battery power pack 14.

The final prospective embodiments of the invention are shown in FIGS. (5)–(5A) and (6)–(6A). FIGS. (5) and (5A) show a single light beam source 6 mounted on a sliding base 20 attached to the center of the straight-edge top surface 2. The long axis of the light beam source 6 is perpendicular to both pencil edges 3 and 4, causing its emitted light beam 7 or 7' to initially run perpendicular to pencil edges 3 and 4. In this configuration, only two light reflectors 21 and 22 are needed to direct the light beam 7 or 7' in either direction along the desired pencil edge 3 or 4. The sliding base 10 moves between two positions, a first position 26 which will send the light beam 7 to the first light reflector 21, and a second position 27 which will send the light beam 7' to the second light reflector 22. If pencil edge 3 is to be used, as shown in FIGS. (5) and (5A), light reflectors 21 and 22 are attached over pencil edge 3 with surfaces perpendicular to each other and perpendicular to the straight-edge mounting surface 2, such that the light beam 7 or 7' strikes either light reflector at a 45 degree angle of incidence. First light reflector 21 will reflect the light beam 7 along the pencil edge 3 in the opposite direction from the reflection of the light beam 7' off the second light reflector 22. If desired, the invention can be manually reconfigured to utilize the opposite pencil edge 4 by mounting light reflectors 21 and 22 over pencil edge 4 in the manner just described, and by mounting the light beam source 6 to the sliding base 20 pointing in the opposite direction so that the light beam 7 or 7' will initially run toward pencil edge 4 instead of pencil edge 3. The prospective embodiment shown in FIGS. (5) and (5A) has a single switch 10 connected to the separately housed battery power pack 14 for energizing the light beam source 6.

In FIGS. (6) and (6A), a single light beam source 6 is attached to the straight edge top surface 2, with its long axis oriented perpendicular to both pencil edges 3 and 4, causing the light beam 7 or 7' emitted from the light beam source 6 to initially run perpendicular to the pencil edges as in FIGS. (5) and (5A). However, instead of being mounted to a sliding base, the light beam source 6 is fixed to the center of the straight-edge top surface 2. The light reflector 21 used in this configuration is comprised of a single reflective surface, housed in a 90 degree elbow 30, which is rotatable between two positions 36 and 37 that are 180 degrees opposed from each other. The 90 degree elbow 30 can be attached over either pencil edge 3 or 4, depending on which is desired for use. As shown in FIG. (6A), when the 90 degree elbow 30 is in its first position 36 the light beam 7 emitted from the light beam source 6 will be reflected at a 45 degree angle of incidence from the light reflector 21, in the opposite direction along the pencil edge 3 from the direction of the light beam 7' when it is reflected from the light reflector 21 with the 90 degree elbow in its second position 37. Again if desired, the invention can be manually reconfigured to utilize the opposite pencil edge 4 by mounting the 90 degree elbow 30 over pencil edge 4 in the manner just described, with the light beam source 6 mounted to the straight edge top mounting surface pointing in the opposite direction so that the light beam 7 or 7' will initially run toward pencil edge 4 instead of pencil edge 3. The prospective embodiment shown in FIGS. (6) and (6A) has a single switch 10 connected to the separately housed battery power pack 14 for energizing the light beam source 6.

METHOD OF USING THE INVENTION

Figure 9:
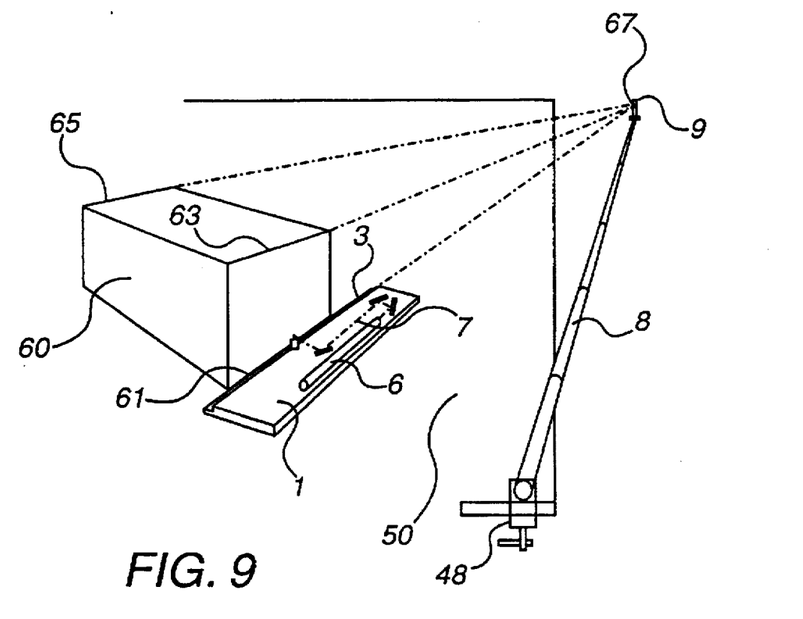
Figure 9A:
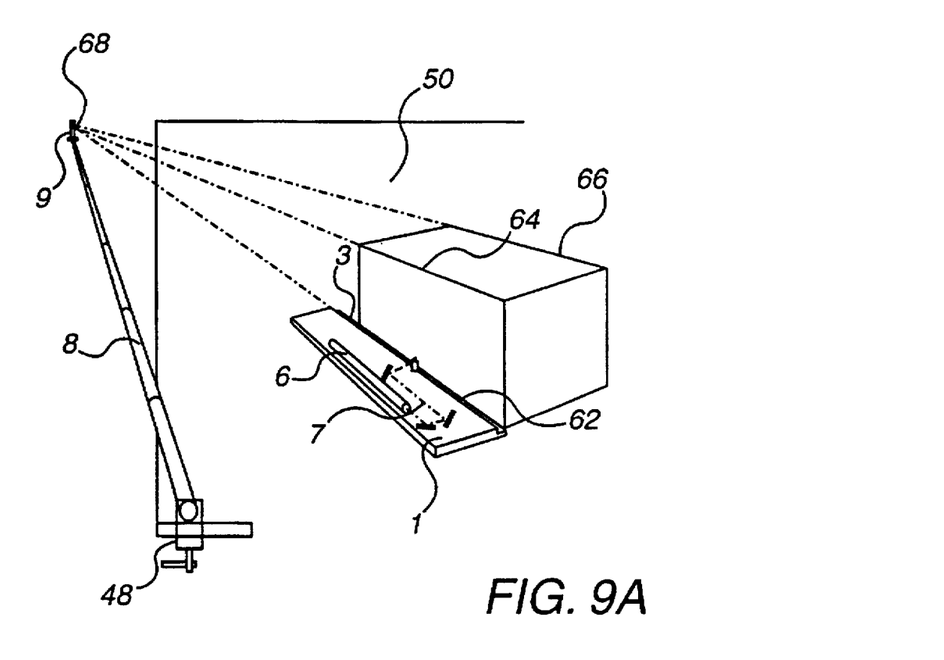

The invention is used by a draftsman or an artist to sight and draw perspective views of objects. As shown in FIGS. (9) and (9A), this is accomplished by first anchoring a vanishing point marker 8 to the sketching surface 50 by use of the "C" clamp 48. The target 9 of the vanishing point marker is fixed at the vanishing point, which is the point in space where parallel lines of the object would intersect if the object were projected into two dimensions to create the feeling of depth. In drawing the box 60 shown in FIGS. (9) and (9A), lines 62, 64 and 66 all intersect at vanishing point 68, while lines 61, 63 and 65 all intersect at vanishing point 67. If drawn relative to their respective fixed vanishing points, these lines will maintain the proper spatial relationship to allow projecting the box into two dimensions while retaining its three-dimensional visual character. The vanishing point is fixed at a location in the plane of the sketching surface 50, which is determined by the user after taking into account the dimensions that the object will possess on paper (i.e., how long, tall, and wide it is to look). After the vanishing point marker target 9 is fixed at the vanishing point 67 corresponding to object lines 61, 63 and 65, the straight-edge 1 is placed on the sketching surface 50 and the desired pencil edge 3 is aligned to a position on the sketching surface which corresponds to the location of the object line 61 to be drawn. This location is found by adjusting the straight-edge 1 with the light beam source 6 energized, such that the light beam 7 strikes the vanishing point marker target 9, after the light beam 7 has been directed along the pencil edge 3 toward the vanishing point 67. The object line 61 is then drawn while the light beam 7 is striking the vanishing point marker target 9. Before moving the vanishing point marker target 9, this process is repeated for each of the other object lines 63 and 65 to be projected from that vanishing point 67. In a like manner as shown in FIG. (9A), vanishing point 68 is fixed, and the process is repeated for drawing object lines 62, 64, and 66.

The invention can also be used to relocate a previously fixed vanishing point if the drawing of the box 60 shown in FIGS. (9) and (9A) is partially or fully complete. The vanishing point marker 8 is fixed to the sketching surface by use of the "C" clamp 48. The vanishing point marker target 9 is placed at a point in space which is near the point that a previously drawn object line 61 would intersect if projected out to its vanishing point 67. The straight-edge 1 is then placed on the sketching surface 50 with a pencil edge 3 lying along the previously drawn object line 61. The light beam source 6 is then energized and the vanishing point marker target 9 is adjusted to allow the light beam 7 to strike it, after the light beam 7 has been directed along the pencil edge 3 toward the true vanishing point 67. The straight edge drawing surface is then aligned with each of the other previously drawn object lines 63 and 65, and the vanishing point marker target 9 is adjusted in a like manner to fix the exact previous location of the corresponding vanishing point 67. As shown in FIG. (9A), the same process can be repeated using lines 62, 64 and 66 to relocate the other vanishing point 68.

I claim:

1. An alignment apparatus, for use in constructing perspective view drawings, comprising:
   (a) a straight edge, having a flat top surface and having on at least one side a straight pencil edge for guiding a drawing implement;
   (b) a light beam source, which is mounted on the straight-edge top surface, and which provides a means for generating a focused light beam, such that the light beam emitted from the light beam source follows an initial path that runs parallel to the pencil edge of the straight-edge, comprising:
      (i) a hollow housing, having an electrically conductive surface which is cylindrical in shape with pen-size dimensions, and having one aperture end;
      (ii) a focusing device, which is located in the aperture end of the housing;
      (iii) a means for generating a light beam, which is located in the housing, and which emits a light beam that passes through the focusing device;
      (iv) a battery power pack, which is located in the housing, and which is electrically connected to the light beam generating means through the electrically conductive surface of the housing; and
      (v) a switch, which is electrically connected in series with both the light beam generating means and the battery power pack, such that the switch controls electric power to the light beam generating means;
   (c) five light reflectors mounted on the straight-edge top surface, with reflective surfaces perpendicular to the straight-edge top surface, consisting of:
      (i) a first light reflector, which is mounted on the straight-edge top surface such that the light beam is reflected from a 45 degree angle of incidence off the first light reflector to a path of travel which is perpendicular to the initial path of the light beam;
      (ii) a second light reflector, which is mounted on the straight edge top surface with a reflective surface perpendicular to the reflective surface of the first light reflector, such that the light beam is reflected from a 45 degree angle of incidence off the second light reflector after being reflected from the first light reflector, to a path which is parallel to and in the opposite direction from the initial path of the light beam;
      (iii) a third light reflector, which is movably mounted on the straight-edge top surface, and having a first position and a second position such that when the third light reflector is in either position, the light beam is reflected from a 45 degree angle of incidence off the third light reflector after being reflected from the second light reflector, to a path which is perpendicular to and approaching a pencil edge of the straight edge;
      (iv) a fourth light reflector, which is mounted on the straight-edge top surface over the approached pencil edge, such that the light beam is reflected from a 45 degree angle of incidence off the fourth light reflector after being reflected from the first position of the third light reflector, to a path which is along the approached pencil edge; and
      (v) a fifth light reflector, which is mounted on the straight-edge top surface over the approached pencil edge with a reflective surface perpendicular to the reflective surface of the fourth light reflector, such that the light beam is reflected from a 45 degree angle of incidence off the fifth light reflector after being reflected from the second position of the third light reflector, to a path of travel which is along the approached pencil edge and which is 180 degrees opposed to the direction of the light beam when reflected from the fourth light reflector; and
   (d) at least one adjustable vanishing point marker, having a stationary target at which the focused light beam is aimed after being directed by a light beam reflector along the pencil edge.

2. An alignment apparatus, for use in constructing perspective view drawings, comprising:
   (a) a straight edge, having a flat top surface and having on at least one side a straight pencil edge for guiding a drawing implement;
   (b) two light beam sources, mounted on the straight-edge top surface, and which provide a means for generating a focused light beam, both light beam sources being fixed to the straight-edge top surface near opposite ends of a pencil edge of the straight edge, such that the light beams emitted from the light beam sources intersect over that pencil edge, each light beam source comprising:

(i) a hollow housing, having an electrically conductive surface which is cylindrical in shape with pen-size dimensions, and having one aperture end;

(ii) a focusing device, which is located in the aperture end of the housing;

(iii) a means for generating a light beam, which is located in the housing, and which emits a light beam that passes through the focusing device;

(iv) a battery power pack, which is electrically connected to the light beam generating means through the electrically conductive surface of the housing; and (v) at least one switch, which is electrically connected in series with both the light beam generating means and the battery power pack, such that the switch controls electric power to the light beam generating means;

(c) two light reflectors mounted on the straight-edge top surface, with reflective surfaces perpendicular to the straight-edge top surface, consisting of:

(i) a first light reflector, which is mounted on the straight-edge top surface over the intersected pencil edge, such that the light beam emitted from the first light beam source is reflected along the intersected pencil edge; and (ii) a second light reflector, which is mounted on the straight-edge top surface over the intersected pencil edge, such that the light beam emitted from the second light beam source is reflected along the intersected pencil edge in a direction which is 180 degrees opposed to the reflected light beam from the first light beam source; and (d) at least one adjustable vanishing point marker, having a stationary target at which the focused light beam is aimed after being directed by a light beam reflector along the pencil edge.

3. An alignment apparatus, for use in constructing perspective view drawings, comprising:

(a) a straight edge, having a flat top surface and having on at least one side a straight pencil edge for guiding a drawing implement;

(b) a single light beam source, which provides a means for generating a focused light beam, which is movably mounted on the straight-edge top surface, such that the light beam emitted from the light beam source initially approaches a pencil edge of the straight-edge from a direction which is perpendicular to that pencil edge, the light beam source being movable between a first position and a second position, the light beam source comprising:

(i) a hollow housing, having an electrically conductive surface which is cylindrical in shape with pen-size dimensions, and having one aperture end;

(ii) a focusing device, which is located in the aperture end of the housing;

(iii) a means for generating a light beam, which is located in the housing, and which emits a light beam that passes through the focusing device;

(iv) a battery power pack, which is electrically connected to the light beam generating means through the electrically conductive surface of the housing; and (v) at least one switch, which is electrically connected in series with both the light beam generating means and the battery power pack, such that the switch controls electric power to the light beam generating means;

(c) two light reflectors mounted on the straight-edge top surface, with reflective surfaces perpendicular to the straight-edge top surface, including:

(i) a first light reflector, which is mounted on the straight-edge top surface over the approached pencil edge, such that the light beam emitted from the first position of the light beam source is reflected from a 45 degree angle of incidence off the first light reflector to a path which is along the approached pencil edge; and (ii) a second light reflector, which is mounted on the straight-edge top surface over the approached pencil edge with a reflective surface perpendicular to the reflective surface of the first light reflector, such that the light beam emitted from the second position of the light beam source is reflected from a 45 degree angle of incidence off the second light reflector, to a path which is along the approached pencil edge and which is 180 degrees opposed to the direction of the light beam when reflected from the first light reflector; and (d) at least one adjustable vanishing point marker, having a stationary target at which the focused light beam is aimed after being directed by a light beam reflector along the pencil edge.

4. An alignment apparatus, for use in constructing perspective view drawings, comprising:

(a) a straight edge, having a flat top surface and having on at least one side a straight pencil edge for guiding a drawing implement;

(b) a single light beam source, which provides a means for generating a focused light beam, which is fixed to the straight-edge top surface, such that the path of the light beam emitted from the light beam source initially approaches a pencil edge of the straight-edge from a direction which is perpendicular to that pencil edge, the light beam source comprising:

(i) a hollow housing, having an electrically conductive surface which is cylindrical in shape with pen-size dimensions, and having one aperture end;

(ii) a focusing device, which is located in the aperture end of the housing;

(iii) a means for generating a light beam, which is located in the housing, and which emits a light beam that passes through the focusing device;

(iv) a battery power pack, which is electrically connected to the light beam generating means through the electrically conductive surface of the housing; and (v) at least one switch, which is electrically connected in series with both the light beam generating means and the battery power pack, such that the switch controls electric power to the light beam generating means;

(c) one light reflector mounted on the straight-edge top surface, which consists of:

(i) a housing, having a 90 degree elbow which is mounted on the straight-edge top surface over the approached pencil edge, the housing being rotatable between a first position and a second position that is 180 degrees opposed from the first position, such that when the housing is in the first position the light beam travels along the approached pencil edge in a direction which is 180 degrees opposed to the direction of the light beam when the housing is in the second position; and (ii) a reflective surface, which is fixed in the housing perpendicular to the straight-edge top surface, such that the light beam is reflected from a 45 degree angle of incidence off the reflective surface to a path of travel which is along the approached pencil edge; and (d) at least one adjustable vanishing point marker, having a stationary target at which the focused light beam is aimed after being directed by a light beam reflector along the pencil edge.

5. An alignment apparatus, for use in constructing perspective view drawings, comprising:

(a) a straight-edge, having a flat top mounting surface and having on at least one side a straight pencil edge for guiding a drawing implement;

(b) a first light beam source, which provides a means for generating a focused light beam, and which is mounted on the straight-edge top surface over a pencil edge of the straight-edge, such that the focused light beam emitted from the first light beam source will travel outwardly along that pencil edge;

(c) a second light beam source, which provides a means for generating a focused light beam, and which is mounted on the straight-edge top surface over the same pencil edge as the first light beam source, such that the focused light beam emitted from the second light beam source will travel outwardly along that pencil edge in a direction 180 degrees opposed to the direction of the focused light beam emitted from the first light beam source; and (d) at least one adjustable vanishing point marker, having a stationary target at which the focused light beam emitted from either the first light beam source or the second light beam source is aimed.

6. The alignment apparatus of claim 5, in which the straight-edge comprises:

(a) a flat top surface;

(b) a rectangular base;

(c) two straight pencil edges, each forming a long side of the rectangular base.

7. The alignment apparatus of claim 5, in which each light beam source is comprised of:

(a) a hollow housing, having an electrically conductive surface which is cylindrical in shape with pen-size dimensions, and having one aperture end;

(b) a focusing device, which is located in the aperture end of the housing;

(c) a means for generating a light beam, which is located in the housing, and which emits a light beam that passes through the focusing device;

(d) a battery power pack, which is electrically connected to the light beam generating means through the electrically conductive surface of the housing; and (e) at least one switch, which is electrically connected in series with the light beam generating means and the battery power pack, such that the switch controls electric power to the light beam generating means.

8. The alignment apparatus of claim 7, in which the focusing device is comprised of a configuration consisting of at least one optical lens.

9. The alignment apparatus of claim 7, in which the light beam generating means is comprised of a laser diode.

10. The alignment apparatus of claim 7, in which the light beam generating means is comprised of a high-intensity flashlight bulb.

11. The alignment apparatus of claim 7, in which the light beam generating means is comprised of a light-emitting diode.

12. The alignment apparatus of claim 7, in which the switch is mechanically actuated.

13. The alignment apparatus of claim 7, in which the switch is electrically actuated.

14. The alignment apparatus of claim 5, in which the vanishing point marker is comprised of:

(a) a collapsing telescopic rod, having an adjustable base subsection that encompasses outer subsections of progressively decreasing diameter;

(b) a "C" clamp, which is anchorable to a flat sketching surface, the "C" clamp being pivotably attached to the base subsection of the telescopic rod such that the vanishing point marker swivels in a plane which includes the sketching surface; and (c) a stationary target, which is attached to the outermost subsection of the telescopic rod, such that the light beam emitted from a light beam source strikes the target after being directed by a light reflector along a pencil edge of the straight-edge.

* * * * *